United States Patent
Rawlings

(10) Patent No.: US 6,382,644 B1
(45) Date of Patent: May 7, 2002

(54) APPARATUS FOR TRANSPORTING AND POSITIONING TIRE AND WHEEL ASSEMBLIES

(75) Inventor: Clifford Craig Rawlings, Missoula, MT (US)

(73) Assignee: Safe Tools Shop, Inc., Missoula, MT (US)

(*) Notice: Subject to any disclaimer, the term of this patent is extended or adjusted under 35 U.S.C. 154(b) by 0 days.

(21) Appl. No.: 09/435,090

(22) Filed: Nov. 5, 1999

(51) Int. Cl.[7] ............................................. B62B 3/10
(52) U.S. Cl. ............... 280/79.4; 280/763.1; 280/47.35; 414/427; 414/428
(58) Field of Search .................. 280/763.1, 766.1, 280/79.11, 79.4, 47.35, 35, 38, 47.131, 47.27, 47.28; 188/5; 254/8 B, 2 R, 5 R; 414/427, 428; 269/17

(56) References Cited

U.S. PATENT DOCUMENTS

| | | | | |
|---|---|---|---|---|
| 1,964,119 A | * | 6/1934 | Hendry | |
| 2,558,535 A | * | 6/1951 | Billings | |
| 3,749,265 A | * | 7/1973 | Smith, Jr. | 414/427 |
| 3,830,387 A | * | 8/1974 | Virnig | 214/331 |
| 4,050,597 A | * | 9/1977 | Hawkins | 414/427 |
| 4,166,583 A | * | 9/1979 | Ruckstuhl | 241/73 |
| 4,239,196 A | * | 12/1980 | Hanger | 269/17 |
| 4,401,405 A | * | 8/1983 | Ealet | 414/428 |
| 4,571,142 A | * | 2/1986 | Niewald et al. | 414/427 |
| 4,705,564 A | * | 11/1987 | Hawkins | 269/17 |
| 4,872,694 A | * | 10/1989 | Griesinger | 280/79.4 |
| 5,362,194 A | * | 11/1994 | Kassebaum | 414/427 |
| 5,378,004 A | | 1/1995 | Gunlock et al. | |
| 5,433,469 A | * | 7/1995 | Cassels | 280/655 |
| 5,820,330 A | * | 10/1998 | Focke et al. | 414/427 |
| 5,950,262 A | * | 9/1999 | Smoler | 5/613 |
| 6,106,214 A | * | 8/2000 | Saffelle et al. | 414/427 |

FOREIGN PATENT DOCUMENTS

JP 02254036 * 10/1990

* cited by examiner

Primary Examiner—Eric Culbreth
Assistant Examiner—David Divine
(74) Attorney, Agent, or Firm—Klarquist Sparkman, LLP

(57) ABSTRACT

An apparatus particularly designed to receive, support, transport and/or position tire and wheel assemblies of vehicles, particularly large vehicles, is described. One embodiment of the apparatus comprised a lower frame, an upright support coupled to the lower frame, a vertical positioning device, and a tire and wheel assembly support operably coupled to the vertical positioning device. Working embodiments included a lower U-shaped frame, generally having plural casters attached thereto, for easy positioning about tires attached to vehicles. A method for receiving, supporting, transporting and positioning tire and wheel assemblies also is described. The method comprises first providing a suitable apparatus. The apparatus is positioned adjacent a tire and wheel assembly of a vehicle. The vertical position of the tire and wheel support assembly is adjusted to engage the tire and wheel assembly. The tire and wheel assembly is then placed on the apparatus, which supports the tire and wheel assembly. This allows an operator to transport the assembly to another location, work on the assembly while it is supported by the apparatus, and/or rotate the assembly while supported by the device for inspection and repair.

11 Claims, 5 Drawing Sheets

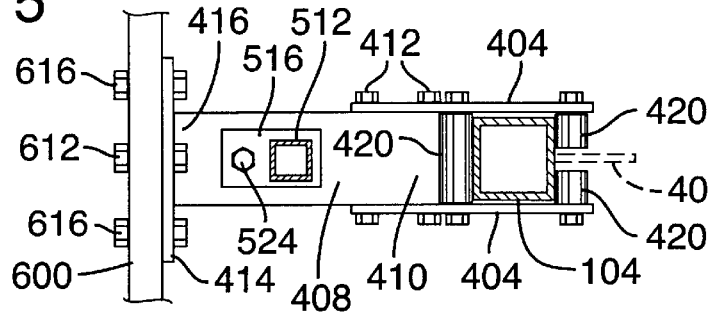
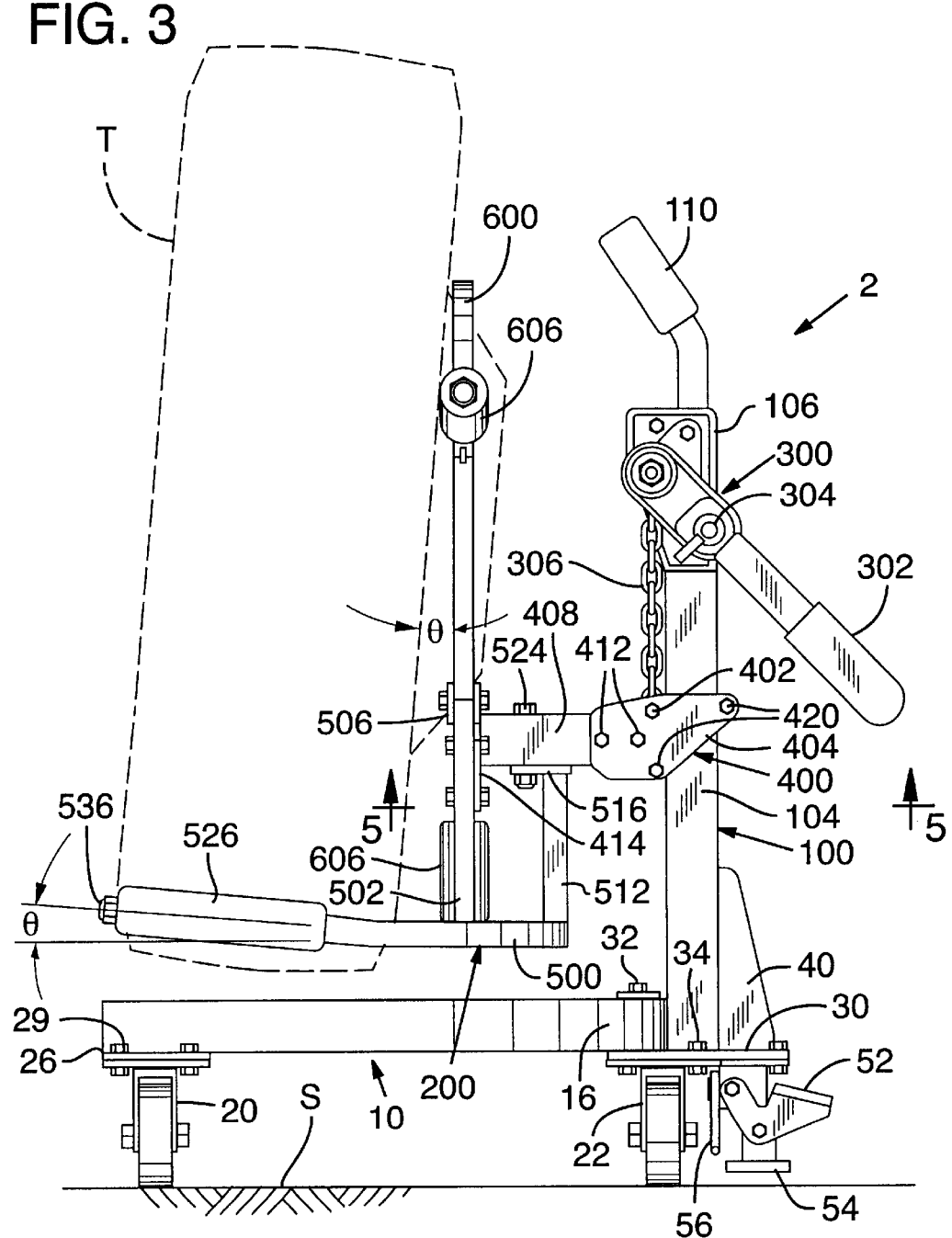

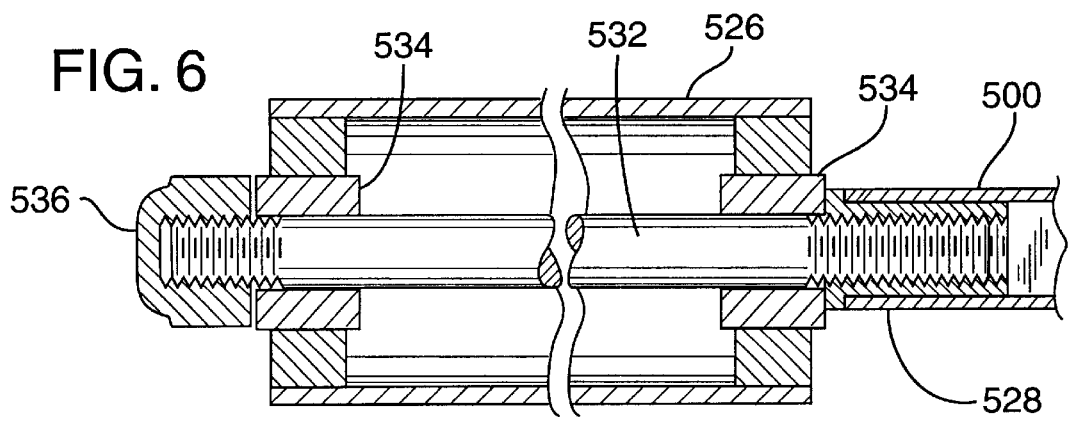
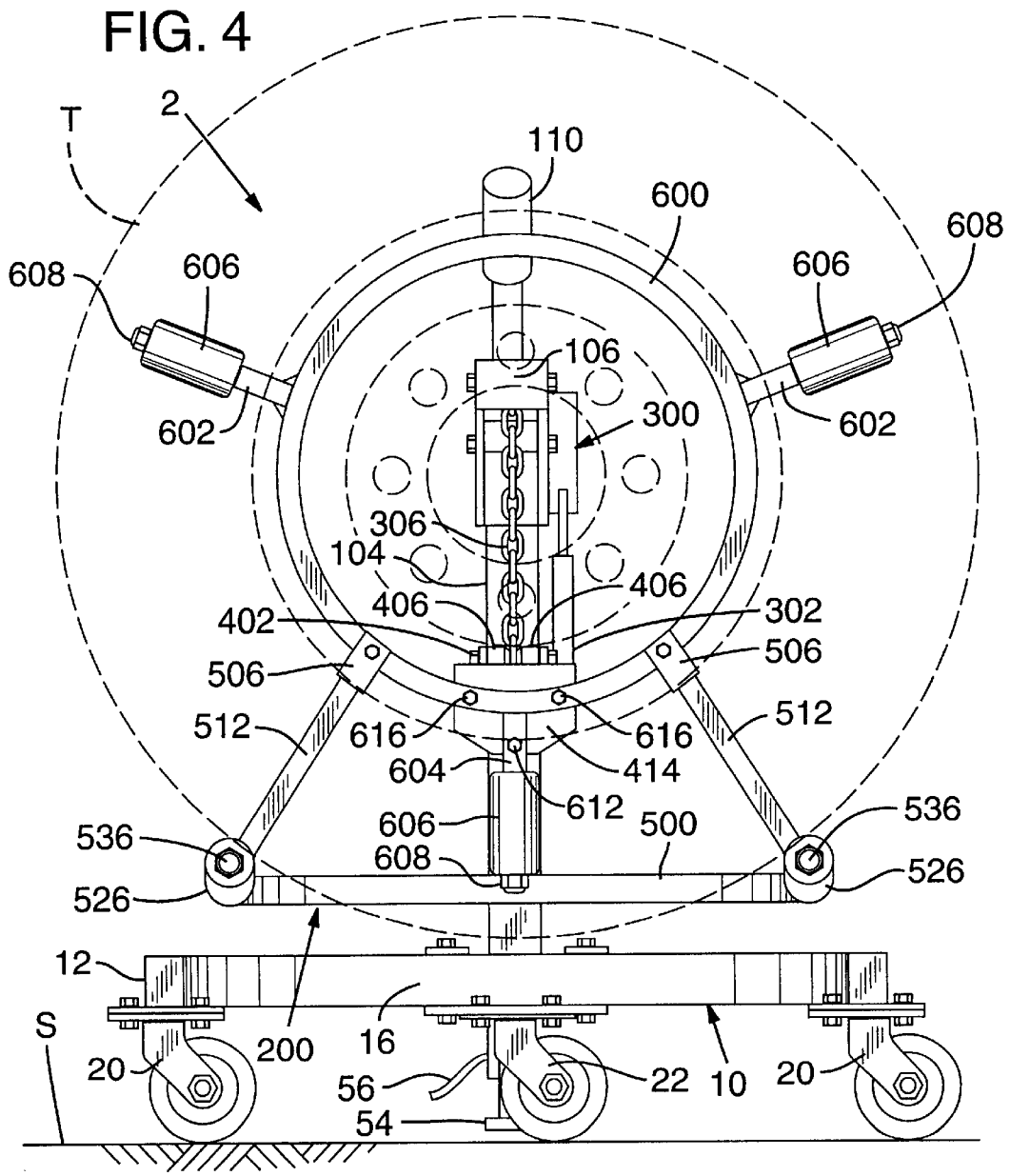

APPARATUS FOR TRANSPORTING AND POSITIONING TIRE AND WHEEL ASSEMBLIES

FIELD

The present invention concerns an apparatus designed to receive, support, transport and/or position tire and wheel assemblies, and a method for using the apparatus to remove the assemblies from vehicles, inspect the assemblies, and/or attach the assemblies to vehicles.

BACKGROUND

Removing tire and wheel assemblies and reattaching such assemblies to vehicles is a difficult and laborious task, particularly when positioning the tire and wheel assembly correctly for mounting it to wheel studs of the vehicle. Although changing a tire and wheel assembly for a personal passenger automobile is not easy, it does not compare to the difficult task of changing single or dual tire and wheel assemblies of large vehicles, such as commercial trucks and semi-tractors and trailers.

Some devices are known that ostensibly were designed to receive and transport tire and wheel assemblies. These devices are little better than hand carts. Known devices, such as dual wheel caddies, provide a very limited vertical position adjustment range of less than 6 inches, and typically only about 4 inches. This means that tire and wheel assemblies supported by such devices cannot be moved to different vertical positions that allow positioning of the device to a lowest vertical position for removing or attaching a wheel assembly and to a highest vertical position that allows an operator to work on the assembly in a comfortable, upright position. Moreover, known devices include no hoist or lifting mechanism by which the vertical position of a tire and wheel assembly can be virtually infinitely incrementally changed to position the device appropriately to receive tire and wheel assemblies as they are removed from the vehicle, or to position the assembly correctly for attaching it to wheel studs of a vehicle.

Devices also are known that have specific structural features designed for removing brake drum and hub assemblies, as opposed to tire and wheel assemblies. For example, U.S. Pat. No. 5,378,004 (the '004 patent) describes a device, referred to as the Back Buddy™, that is useful for coupling to and removing brake drum and hub assemblies. The Back Buddy™ has structural features specifically designed to receive brake drum and hub assemblies. For example, the '004 patent discusses hub assembly attachment members that are designed specifically for coupling to hub assemblies. While the Back Buddy™ works quite well for removing brake drum and hub assemblies, it is of little use for removing, supporting and/or transporting tire and wheel assemblies.

The need for a device designed specifically for removing tire and wheel assemblies has persisted since the advent of vehicles. Despite this persistent need, no suitable device appears to have been developed for handling, positioning and transporting tire and wheel assemblies.

SUMMARY

The present invention provides an apparatus, and method for its use, that addresses the problems identified above in the Background. For example, a working embodiment of the device includes a tire and wheel support that eliminates the need to chain assemblies to the device, which generally is required with prior known devices. The apparatus also generally is easier to maneuver than known devices. And, the vertical position of the tire and wheel support can be adjusted to (1) a lowest position that allows removing a wheel assembly from a vehicle and placing it directly on the apparatus, or allows attaching the wheel assembly directly onto wheel studs of a vehicle from the apparatus, and (2) to a highest vertical position that allows one to work on the wheel assembly in a comfortable, upright position. Moreover, rollers on the tire and wheel support allow facile repositioning of the tire and wheel assembly, particularly rotating the assembly while it is supported by the apparatus, which is helpful for, amongst other things, inspecting a tire and wheel assembly.

One embodiment of the apparatus is particularly designed to receive, transport and position tire and wheel assemblies of vehicles, particularly large vehicles. This embodiment of the apparatus comprised a lower frame, an upright support coupled to the lower frame, a vertical positioning device, and a tire and wheel assembly support operably coupled to the vertical positioning device. Working embodiments included a lower U-shaped frame having plural casters attached thereto for easy positioning of the apparatus, particularly for positioning the apparatus under fender wells and about tires attached to vehicles.

Tire and wheel assemblies are supported on the apparatus using a tire support. One embodiment of the tire support included a tire support ring coupled to a tire support bracket. As used herein, "ring" refers to any geometric shape that can receive the hub (or other lateral projecting portion) of a tire and wheel assembly, such as, but not limited to, squares, rectangles, triangles and circles. A working embodiment of the tire support ring was substantially circular with a ring diameter sized to receive hubs.

The tire support bracket was designed to directly engage a tire with the tire supported by the apparatus. One embodiment of the tire support bracket included elongated tire support members extending from the support bracket. The terminal ends of the support members were angled upwardly from parallel to a surface supporting the apparatus. These inclined support members allow the tire and wheel assembly to recline slightly back from vertical to allow it to rest securely on the apparatus.

The apparatus also generally included plural support rollers for engaging a tire. For example, one embodiment of the apparatus included 3 rollers positioned at 120° intervals about the circumference of a substantially circular tire support ring. Additional tire-engaging rollers also can be coupled to the tire support members of the tire support bracket.

The apparatus also generally includes a floor stop. The floor stop allows the apparatus to be firmly locked into a desired position for removing or attaching the wheel assembly, or into a desired position for inspecting or working on the assembly. Working embodiments of the floor stop included a foot-actuated pedal for actuating the floor stop to lock the apparatus into a desired position, a foot actual release bar to release the stop so that the apparatus could be moved, or both.

The present invention also provides a method for receiving, supporting, transporting and/or positioning tire and wheel assemblies. The method involves providing an apparatus comprising a lower frame, an upright support coupled to the lower frame, a vertical positioning device, and a tire and wheel assembly support operably coupled to the vertical positioning device. A tire and wheel assembly is placed on this apparatus, which thereafter supports the assembly for, for example, inspection and/or repair.

The apparatus also can be used to remove and/or attach tire and wheel assemblies to vehicles. For these embodiments of the method, the apparatus is positioned adjacent a tire and wheel assembly of a vehicle. The vertical position of the tire and wheel support assembly is adjusted to a lowest vertical position to engage the tire and wheel assembly. The tire and wheel assembly is then removed from the vehicle and placed on the apparatus, which supports the tire and wheel assembly. This allows an operator to transport the assembly to another location, or work on the assembly while it is supported by the apparatus. Once the tire and wheel assembly has been inspected or repaired as needed, then the apparatus of the present invention is used to transport the assembly to a position adjacent the vehicle for reattaching the assembly to the wheel studs.

BRIEF DESCRIPTION OF THE DRAWINGS

FIG. 3 is a side view of the embodiment illustrated by FIG. 1.

FIG. 4 is a front view of the embodiment illustrated by FIG. 1.

FIG. 5 is a sectional view taken along line 5—5 of FIG. 3.

FIG. 6 is a schematic cross sectional view of tire rollers threadedly coupled to one embodiment of a tire support.

DETAILED DESCRIPTION

Figure 1:
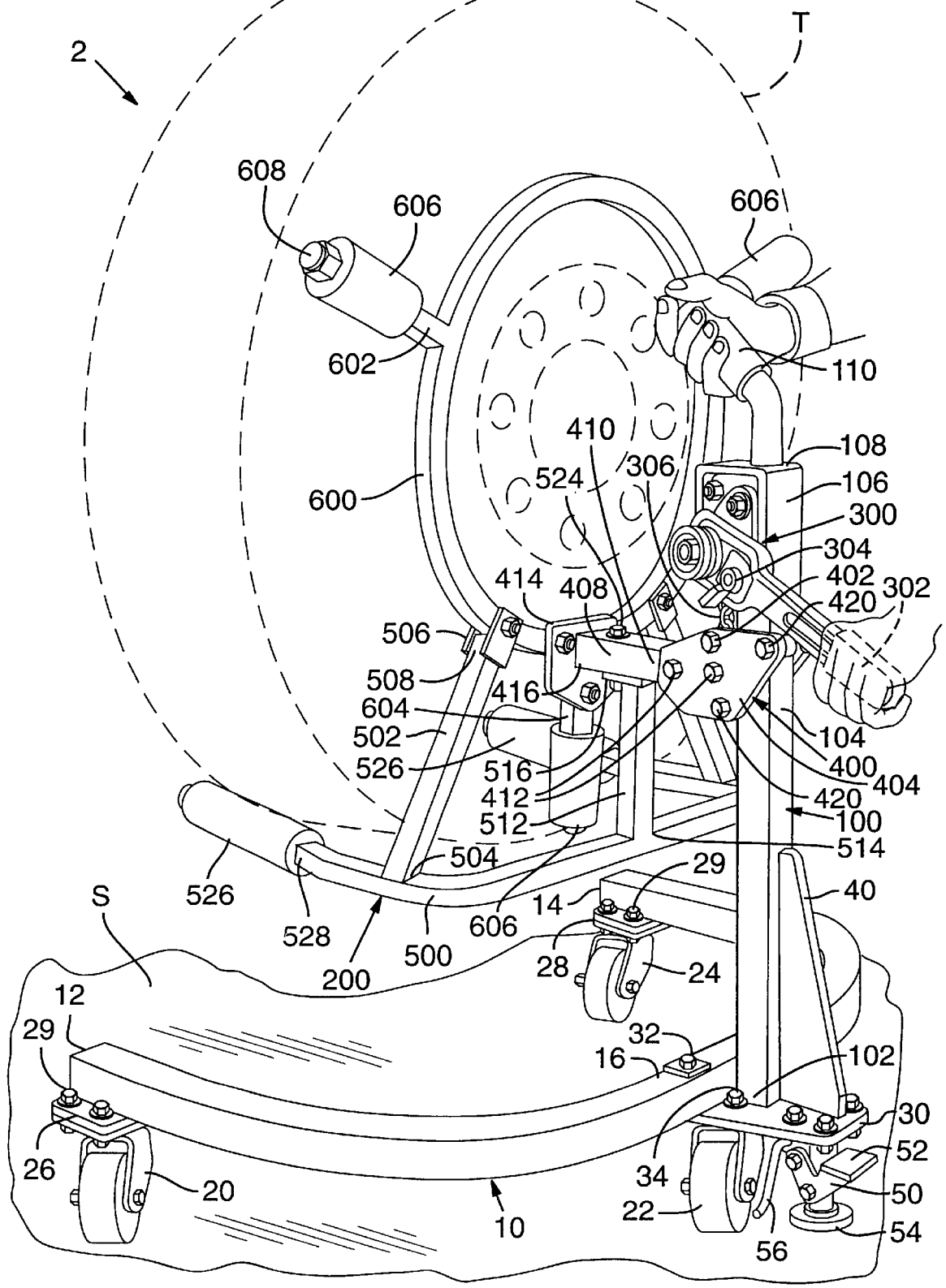
FIG. 1 is a side perspective view of one embodiment of an apparatus of the present invention supporting a tire and wheel assembly.

With reference to FIG. 1, apparatus 2 typically includes a frame 10, an upright support and vertical positioning device 100, and a tire and wheel support 200. Each of these is discussed in detail below. Where different figures illustrate similar parts, identical reference numerals are used to identify such parts.

I. APPARATUS
A. Lower Frame Portion

FIG. 1 illustrates one embodiment of an apparatus 2 having a lower U-shaped frame portion 10. U-shaped frame 10 has a first end 12, a substantially similar second end 14 and a middle section 16. Working embodiments of apparatus 2 included a U-shaped frame 10 for several reasons. First, the U-shape allows personnel to position frame 10 about the tire while it is attached to an automobile. This feature can be accomplished using a frame having some shape other than a U-shape, such as a rectangular frame, and all such shapes are included in the term "frame." A rectangular frame 10 has been made by welding several straight portions together. This weakens the frame at the weld-material interfaces. Moreover, it creates sharp angles and faces, which can cause injury to personnel, buildings or articles, or which require additional working to remove the sharp angles and/or faces. In contrast, the illustrated U-shaped frame 10 has smooth curves and faces. This is because it is made from a single piece of stock and is formed by pressing the stock into the desired shape. The illustrated frame was made from 2 inches×2inches×⅛ inch steel tubing.

The working embodiment of frame 10 illustrated in FIG. 1 had dimensions that allowed it to be positioned under fender wells and about tire and wheel assemblies of large vehicles. It will be appreciated that these dimensions can vary and still be within the scope of the present invention. For example, different sized frames 10 could be used for automobiles using tire and wheel assemblies having varying sizes and shapes.

Apparatus 10 preferably must be easily maneuvered in tight positions for receiving tire and wheel assemblies. The illustrated U-shape was used to make working embodiments of apparatus 2 for an additional reason, i.e. it provides better maneuverability relative to a rectangular frame. Illustrated frame 10 includes casters 20, 22 and 24. Casters 20 and 24 were connected to frame 10 in a similar manner using two similar caster mounting plates 26 and 28. The illustrated caster mounting plates 26 and 28 were welded to frame 10. Caster mounting plates 26 and 28 define fastener receiving apertures therethrough. In the illustrated working embodiment of apparatus 2, casters 20 and 24 were coupled to caster mounting plates 26 and 28, respectively, using threaded fasteners 29.

Apparatus 2 includes a third caster 22. Caster 22 was coupled to middle section 16 of frame 10 and upright support 100 using a mounting plate 30. Mounting plate 30 was welded to upright support 100 and gusset plate 40 in the illustrated working embodiment. Gusset plate 40 was made from 3/16 inch steel and was 4 inches wide at its widest section, 1 inch wide at the top, and 12 inches high. Mounting plate 30 was further coupled to lower frame 10 using threaded fasteners 32. Mounting plate 30 also defined apertures for receiving fasteners, and caster 22 was coupled to mounting plate 30 using threaded fastener 34.

Figure 2:
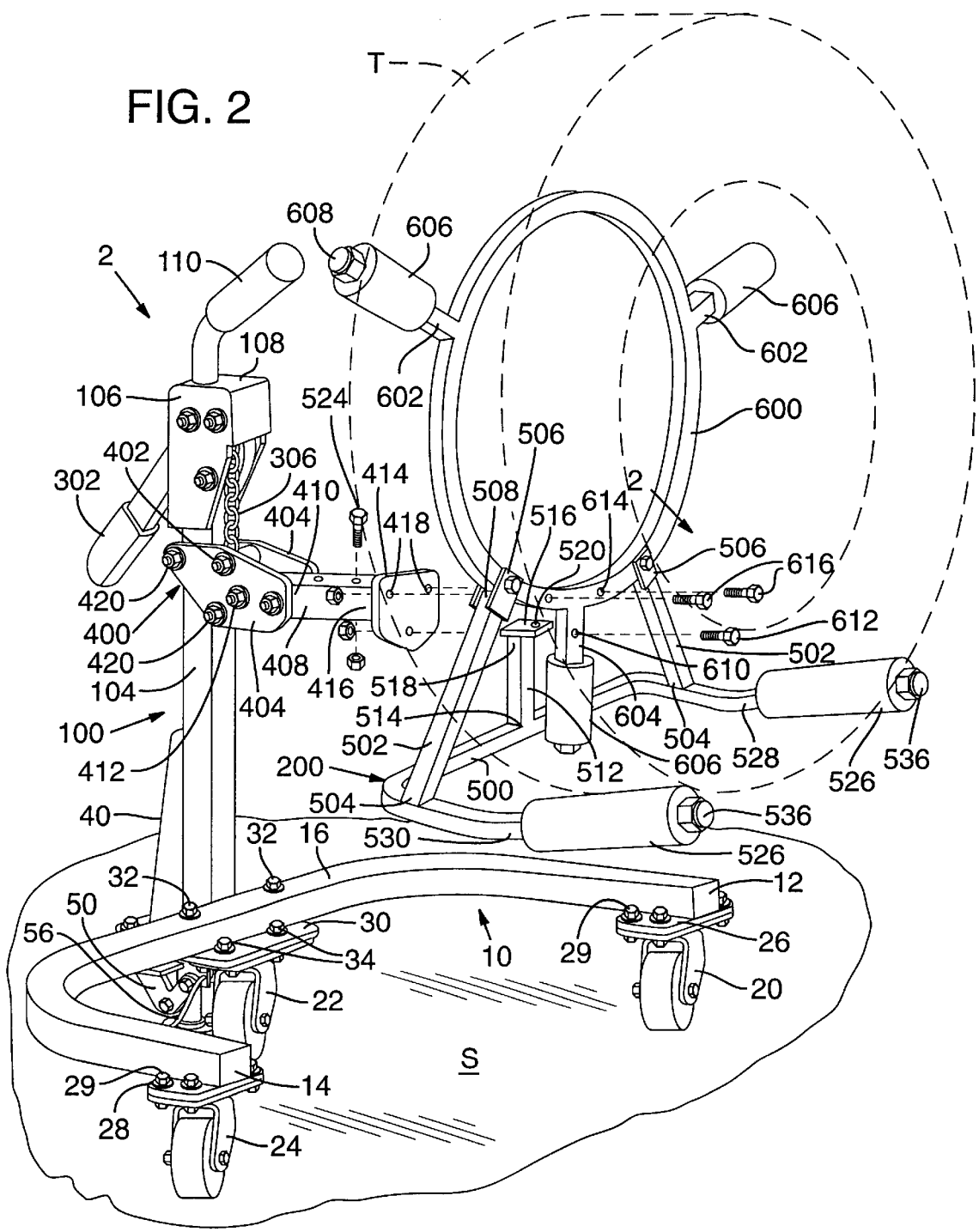
FIG. 2 is a side perspective exploded view of the opposite side of the embodiment illustrated by FIG. 1.

Working embodiments of apparatus 2 further included a foot-actuated floor stop 50. The illustrated floor stop 50 was purchased from Colson Caster Corporation, model No. 9.06253.4, of Jonesboro, Ark. Floor stop 50 includes foot pedal 52, a floor engaging stop 54 and a release bar 56. Actuating floor stop 50 locks apparatus 2 into a desired position. With apparatus 2 in proper position, foot pedal 52 is actuated by depressing it downwardly, which lowers floor stop 54 to engage top surface S of the floor. Floor stop 50 can be released for subsequently moving apparatus 10 by actuating release bar 56. FIGS. 1 and 2 show that release bar 56 extends outwardly from both sides of apparatus 2. Thus, release bar 56 can be actuated from both sides of the apparatus 2.

Frame portion 10, and other components of apparatus 2, can be made from any suitable material. Sturdy metals or metal alloys, such as steel and aluminum, are the most likely materials to be used for making apparatus 2. The illustrated embodiment of apparatus 2 was made from steel, primarily for strength and cost reasons. It will be appreciated that other materials also could be used to make apparatus 2, as long as such materials provide suitable physical properties. Polymeric materials are examples of materials, in addition to metal and alloys, that can be used to make the components of apparatus 2.

B. Upright Support and Vertical Adjustment Mechanism

Apparatus 2 includes upright support 100. Support 100 has a first end 102 and a second end 104. First end 102 is coupled to lower frame 10 by mounting plate 30 and gusset plate 40. Upright support 100 was made from square tubular steel stock, having 2 inches×2inches×⅛ inch dimensions.

A ratchet mechanism housing 106 was coupled to the upright support 100 by welding housing 106 to second end 104 of upright support 100. Housing 106 comprised a wall having a flat top surface 108. Personnel handle 110 was welded to the top surface 108 of the ratchet mechanism housing 106.

Housing 106 houses portions of a ratchet lever hoist assembly 300. The illustrated ratchet lever hoist is commercially available as a Jet Ratchet Lever Hoist, Model No.

MM50 ½ ton, from Jet Equipment & Tools, of Auburn, Wash. The illustrated ratchet hoist 300 comprises a hand-actuated ratchet handle 302. Hoist 300 further includes a switch 304 (FIG. 1). Switch 304 can be toggled by an operator to select for either upward or downward movement of chain 306. Actuating handle 302 actuates a ratchet and pawl system (see FIG. 7, and the written description provided below) that is operably coupled to chain 306. The ratchet and pawl system provides virtually infinite incremental adjustment capability along the upright axis defined by upright support 100. The ratchet and pawl system also can be locked in place at any given vertical position within the range of possible positions available. Working embodiments of hoist 300 provided a total vertical position adjustment range of about 18 inches.

Figure 7:
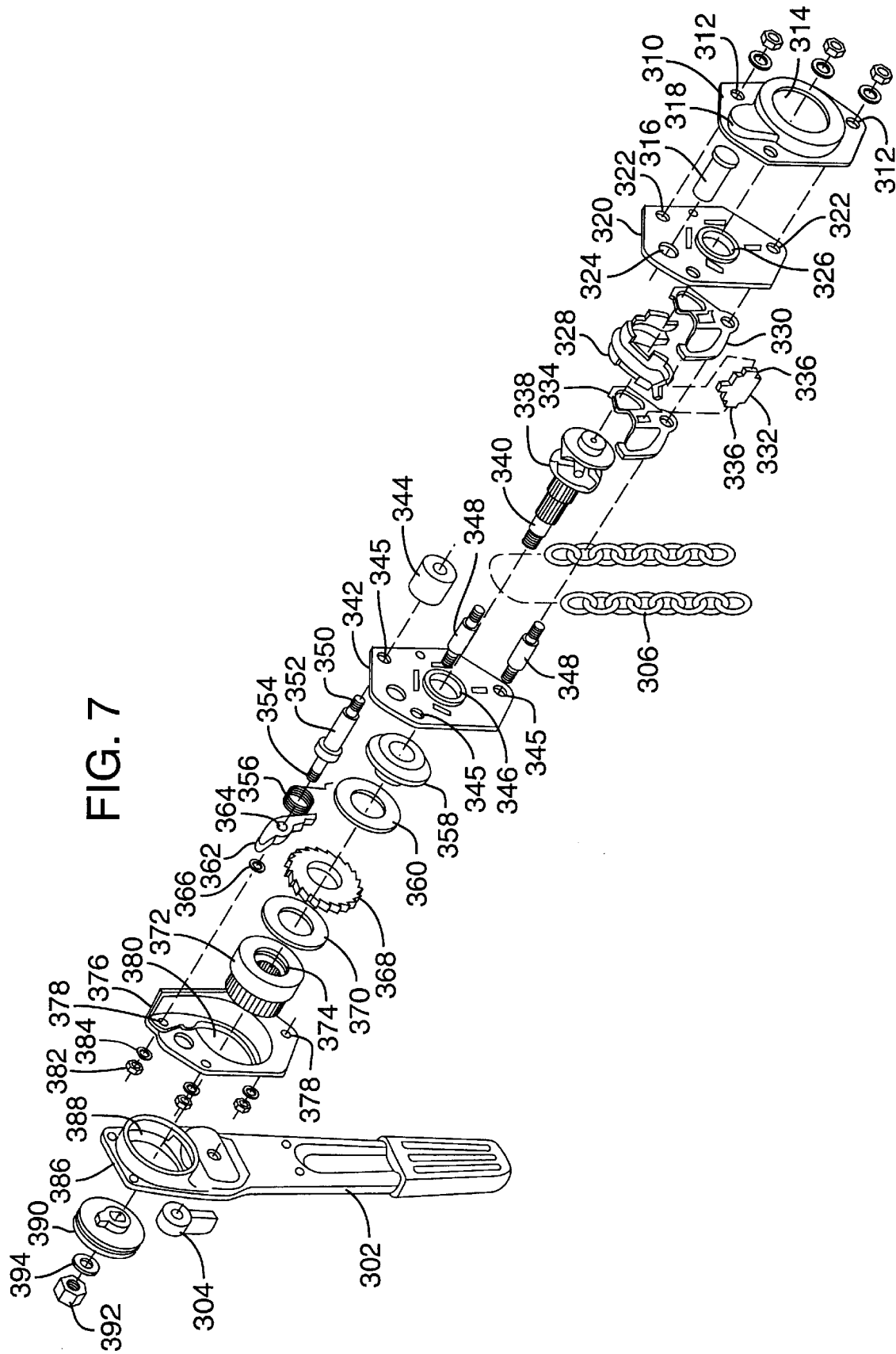
FIG. 7 is an exploded view of one embodiment of a vertical positioning device.

FIG. 7 illustrates a working embodiment of the Ratchet Lever Hoist Assembly 300. Describing the elements of the Ratchet Lever Hoist Assembly 300 from right to left in FIG. 7, the device comprised a load sheave cover 310, which defined fastener apertures 312 therethrough. Load sheave cover 310 further defined a load sheave receiving aperture 314.

Operably coupled to load sheave cover 310 was a top hook pin 316. Top hook pin 316 was received in pin receiving portion 318 of load sheave cover 310.

The hoist assembly further included a gear slide plate 320. Plate 320 defined fastener apertures 322, top hook pin receiving aperture 324 and load sheave receiving aperture 326. Top hook pin 316 was received through aperture 324.

The illustrated ratchet assembly further included a chain guide 328. A first side of chain guide 328 was positioned adjacent gear slide plate 320 and further adjacent chain leader 330. Furthermore, chain guide 328 was operably positioned adjacent chain stripper 332. On a second side of chain guide 328 was positioned chain leader 334. Chain leaders 330 and 334 were coupled together by chain stripper 332. Chain stripper 332 defined tabs 336, which were inserted into tab receiving apertures defined in each of the respective chain leaders 330, 334.

Load bearing sheave 338 was operably positioned adjacent chain leader 334. Chain 306 passes around shaft 340 of load sheave 338 when the ratchet hoist 300 is assembled.

Steel pipe 344 was positioned between gear slide plate 320 and wheel side plate 342. Steel pipe 344 spaced plate 320 from 342. Wheel side plate 342 defined fastener receiving aperture 345 and load sheave receiving aperture 346. Plural fasteners 348 were inserted through apertures 345 in wheel side plate 342 and gear side plate 320. Furthermore, a first end 350 of ratchet pin 352 was inserted through similar aperture 345 defined by wheel side plate 342. A second end 354 of ratchet pin 352 passed through a looped end of a ratchet spring 356. Operably positioned adjacent wheel side plate 342 were disc hub 358 and brake 360.

Ratchet pawl 362 was operably positioned adjacent ratchet spring 356. Pawl 362 defined a fastener receiving aperture 364. Second end 354 of ratchet pin 352 was inserted through aperture 364 and through washer 366. Pawl 362 was operably positioned adjacent wheel side plate 342 for engaging wheel 368. Pawl 362 and wheel 368 allow virtually infinite incremental adjustment of the vertical position of chain 306. A second brake 370 was positioned adjacent wheel 368.

Feed gear 372, which defined load sheave receiving aperture 374, was operably positioned adjacent brake 370. Positioned adjacent to feed gear 372 was brake cover 376. Brake cover 376 defined plural fastener apertures 378 and feed gear receiving aperture 380. Threaded end 354 of ratchet pin 352 was inserted through fastener receiving aperture 378, and coupled to brake cover 376 by nuts 382 and washers 384.

A first feed gear receiving end 386 of handle 302 defined feed gear receiving aperture 388. Feed gear 372 was inserted through feed gear aperture 380 of brake cover 376, through feed gear receiving aperture 388 of handle 302, and coupled to handle 302 using lever setter 390, nut 392 and washer 394.

Chain 306 was coupled to a horizontal extension and mounting device 400. In the illustrated embodiment of apparatus 2, chain 306 was coupled to device 400 by bolt 402 (FIG. 4), which extended through mounting plates 404. Bolt 402 also was inserted through two spacers 406 (FIG. 4). Spacers 406 were used to keep chain 306 in a proper centered position on bolt 402 during operation.

Mounting plates 404 were coupled to horizontal extension member 408. In the illustrated working embodiment a first end 410 of the extension member 408 was attached to mounting plates 404 using two threaded fasteners 412 (FIG. 5). Horizontal slider plate 414 was attached to a second end 416 of extension member 408. In the illustrated embodiment, slider plate 414 was welded to the extension member 408. Slider plate 414 defines plural fastener receiving apertures 418 therethrough (FIG. 2).

Commercially available plural cam followers 420 were coupled to mounting plates 404 using threaded fasteners. Mounting plates 404 were spaced apart to fit about upright support 100 with cam followers 420 operably engaging the external surface of upright support 100.

Actuating handle 302 either extends or retracts chain 306. Thus, actuating handle 302 varies the vertical position of horizontal extension and mounting device 400.

C. Tire and Wheel Support

Apparatus 2 includes a tire and wheel support 200. The illustrated embodiment of apparatus 2 included a support 200 comprising a tire support 500 and a tire support ring 600. Tire support 500, similar to lower frame 10, was pressed into the desired illustrated shape from a single piece of stock steel tubing, which was 1 inch×1inch by 11 gauge tubing.

Plural support members were attached, such as by welding, to the support 500. The illustrated working embodiment had two tire support ring positioning and support members 502 welded thereto at a suitable angle to engage and position tire support ring 600 appropriately for receiving wheels. A first end 504 of each support member 502 was cut at an angle of about 70° from horizontal, so that when member 502 was welded to support 500, support members 502 extended at corresponding angles. This angle is not critical to the function of apparatus 2; support members at various angles will adequately support and position tire support ring 600, and all such embodiments are within the scope of the present invention.

Mounting plates 506 were attached, such as by welding, to a second end 508 of each support member 502. Mounting plates 506 were spaced apart a distance sufficient to receive tire support ring 600 therebetween. Moreover, mounting plates 506 defined apertures therethrough for receiving fasteners 510. Fasteners 510 were used to couple support ring 600 to the support members 502.

An upright support member 512 also was attached, such as by welding, at a first end 514 to tire support 500. Mounting plate 516, best shown in FIG. 2, was attached, again such as by welding, to a second end 518 of upright support member 512. Mounting plate 516 defined fastener receiving aperture 520 (FIG. 2). Aperture 520 was aligned with a corresponding fastener receiving aperture on horizontal extension member 408. Threaded fasteners 524 were threaded through fastener aperture 520 to secure the tire support 500 to horizontal extension arm 408.

Rollers 526 were coupled to first end 528 and second end 530 of tire support 500. In a working embodiment, rollers 526 were 6-inches long. Rollers 526 engage tire T during handling to make positioning the tire easier. As illustrated by FIG. 6, tire support 500 was threaded to receive threaded ends of roller studs 532. Roller studs 532 were inserted through plural bushings 534, through rollers 526 and thereafter threadedly mated with the threads of support 500. Threaded nut caps 536 were threaded onto the threaded ends of roller studs 532.

Tire support ring 600 included two roller support members 602 and a third roller support member 604 welded thereto. Roller support members 602 and 604 were positioned approximately 120° degrees one from another around the circumference of substantially circular tire support ring 600. Tire support ring was made from the same stock used to make bracket 500, and included one weld to form the substantial circular shape of tire support ring 600. Rollers 606, approximately 4.5 inches in length, were coupled to roller support members 602 and roller support member 604 using roller studs 608 substantially as described above with reference to FIG. 6 and roller stud 532. Roller studs 608 were inserted through bushings (not shown), through rollers 606 and thereafter threadedly mated with the threads of roller support members 602 and 604.

Roller support member 604 defined a fastener receiving aperture 610 (FIG. 2) therethrough. Fastener 612 was threaded through aperture 610 to further secure tire support ring 600 to extension arm 408. Tire support ring 600 was further coupled to horizontal extension arm 408 by aligning fastener apertures 418 in slider plate 414 with fastener apertures 614. Threaded fasteners 616 were inserted through these apertures 614 for firmly securing tire support ring 600 to slider plate 414 of horizontal extension arm 404.

II. OPERATION

To retrieve a tire from an automobile, the vertical position of tire and wheel support 200 generally is first lowered to its lowest position by placing switch 304 in the proper position to extend chain 306 by actuating handle 302. This allows apparatus 2 to be positioned under the fender well of a vehicle. An operator grasps handle 110 to position apparatus 2 adjacent the tire and wheel. U-shaped lower frame 10 is sized and shaped to make this positioning easy. Moreover, using three casters 20, 22 and 24 and locating them at the illustrated positions on lower frame 10 provides for efficient maneuverability of apparatus 2.

The operator now removes, or has previously removed, the lug nuts so that the wheel and tire assembly can be separated from the automobile. Tire support 500 is positioned in the appropriate vertical position by actuating handle 302 so that rollers 526 fly engage the tire. The tire is canted slightly towards the operator (FIG. 3, and the angle θ) so that the wheel is positioned inside of the tire support ring 600. This positioning, and the upward angle of ends 528 and 530 of tire support 500, allow the tire to be sufficiently securely held on apparatus 2 by the operator so that the tire and wheel assembly can be moved away from the vehicle without having to firmly secure it to apparatus 2, such as by using a chain to secure the assembly to apparatus 2.

Once a tire and wheel assembly is placed on apparatus 2, a further advantage of the invention is realized. Personnel must rotate the tire and wheel assembly for both inspection and repair. The tire and wheel assembly is easily rotated simply by spinning it by hand. The tire and wheel assembly is relatively free spooling because tire T rests against rollers 526 and 606.

The present invention has been described with respect to certain embodiments. The scope of the invention should not be limited to these described embodiments, but rather should be determined by reference to the following claims.

I claim:

1. An apparatus for receiving, transporting and positioning tire and wheel assemblies, each assembly having a circumferential tire tread surface, adjoining side surfaces extending generally radially inwardly from the tread surface and a hub portion radially centered about an axis and projecting axially beyond an adjacent one of the side surfaces, the apparatus comprising:

a lower frame;

an upright support coupled to one side of the lower frame;

a vertical positioning device coupled to the upright support; and a tire and wheel assembly support slidingly engaged with the upright support and vertically movable with the vertical positioning device, the tire and wheel assembly support being cantilevered from the upright support to extend over the frame and having a lower portion against which the tread surface of a received assembly rests and a side portion extending upwardly from the lower portion, the side portion having a circular opening generally coaxial with and sized to receive the hub portion of the received assembly and at least one attached roller at a height above the axis of the received assembly, wherein the lower and side portions are positioned relative to each other such that the received assembly is inclined to rest against the support at an angle offset from vertical by contact of one side surface in an area above the axis with the upper portion of the support, the hub portion extending at least partially through the opening, and the tread surface contacting the lower portion of the support, the axis of the received assembly being inclined relative to horizontal by the same angle, and wherein the lower and side portions maintain the received tire and wheel assembly inclined at the same angle throughout raising and lowering of the tire and wheel assembly.

2. The apparatus according to claim 1 where the lower frame is U-shaped and sized for positioning about tires attached to vehicles.

3. The apparatus according to claim 2 where the lower frame further includes a plurality of casters attached thereto.

4. The apparatus according to claim 1 where the lower portion of the tire and wheel assembly support includes elongated tire support members extending from the support, the terminal ends of the support members being angled upwardly from parallel to a surface supporting the device.

5. The apparatus according to claim 4 where the terminal ends of the support members are angled upwardly at an angle of from about 3° to about 10°.

6. The apparatus according to claim 4 where the terminal ends of the support members are angled upwardly at an angle of about 5° from horizontal.

7. The apparatus according to claim 1 where the tire and wheel assembly support includes plural support rollers for engaging a tire.

8. The apparatus according to claim 7 where the upper portion of the tire and wheel assembly support includes three rollers positioned about a circumference of the opening at substantially equally spaced intervals.

9. The apparatus according to claim 1 and further including a floor stop.

10. The apparatus according to claim 9 where the floor stop includes a foot-actuating pedal, a foot actuated release bar, or both.

11. The apparatus according to claim 1 further comprising a handle operably connected to the upright support.

* * * * *